United States Patent
Lin et al.

(10) Patent No.: US 9,574,738 B2
(45) Date of Patent: Feb. 21, 2017

(54) LENS, LIGHT EMITTING DEVICE AND BACKLIGHT MODULE

(71) Applicant: HON HAI PRECISION INDUSTRY CO., LTD., New Taipei (TW)

(72) Inventors: Po-Yu Lin, New Taipei (TW); Chien-Hui Lin, New Taipei (TW); Tai-Cherng Yu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/724,747

(22) Filed: May 28, 2015

(65) Prior Publication Data

US 2016/0348873 A1 Dec. 1, 2016

(51) Int. Cl.
*F21V 5/04* (2006.01)
*G02B 3/02* (2006.01)
*F21K 99/00* (2016.01)
*F21Y 101/02* (2006.01)

(52) U.S. Cl.
CPC . *F21V 5/04* (2013.01); *F21K 9/50* (2013.01); *G02B 3/02* (2013.01); *F21Y 2101/02* (2013.01)

(58) Field of Classification Search
CPC ............... G02B 3/02; F21K 9/50; F21V 5/04; F21Y 2101/02
USPC ............ 362/311.01, 311.02, 311.06, 311.14, 362/311.15, 335, 326, 237, 244
See application file for complete search history.

(56) References Cited

U.S. PATENT DOCUMENTS

| | | | |
|---|---|---|---|
| 7,798,679 B2 * | 9/2010 | Kokubo | G02B 19/0061 362/335 |
| 2010/0135028 A1 * | 6/2010 | Kokubo | G02B 3/02 362/311.06 |

* cited by examiner

*Primary Examiner* — Y M Lee
(74) *Attorney, Agent, or Firm* — Zhigang Ma

(57) ABSTRACT

A lens includes a light incident surface and a light output surface. In a coordinate system, the light incident surface satisfies a formula (1):

$$Z_{r_1} = \frac{c_1 r_1^2}{1 + \sqrt{1 - r_1^2 c_1^2}} + \frac{u_1^2(1-u_1^2)}{\sqrt{1-r_1^2 c_1^2}} \sum_{m=0}^{M} a_m Q_m(u_1^2).$$

$c_1$ is a curvature of the light incident surface. $r_1$ is a distance from the center of the lens to a joint point between the light input surface and a radius which is substantially perpendicular to the central axis of the lens. $u_1$ is a normalized radius of the light incident surface. $a_m$ represents the aspheric coefficient. $Q_m$ is a polynomial of order m and represents that the sum of $a_m$ is equal to the sum of the root mean square of the slope of the light incident surface. The light output surface satisfies a formula (2):

$$Z_{r_2} = \frac{c_2 r_2^2}{1 + \sqrt{1 - r_2^2 c_2^2}} + \frac{u_2^2(1-u_2^2)}{\sqrt{1-r_2^2 c_2^2}} \sum_{m=0}^{M} a_m Q_m(u_2^2).$$

13 Claims, 3 Drawing Sheets

LENS, LIGHT EMITTING DEVICE AND BACKLIGHT MODULE

FIELD

The subject matter herein generally relates to optic technologies and, particularly, to a lens, a light emitting device having the lens, and a backlight module having the light emitting device.

BACKGROUND

With ongoing developments in display technology, a backlight module using a number of light-emitting diodes (LEDs) as light emitting devices for irradiating a liquid crystal display (LCD) has become widely used in a variety of consumer electronic devices, such as cellular telephones, computers, digital cameras, personal digital assistants (PDAs), and the like. The LEDs in the backlight module are arranged in a matrix manner in a tabular region having substantially the same shape as a panel of the LCD. The backlight module, on a back side of the LCD, irradiates, with light from the LEDs, in a planar orientation to the LCD. In the backlight module, a brightness distribution of light has been made substantially uniform by a lens.

BRIEF DESCRIPTION OF THE DRAWINGS

Implementations of the present technology will now be described, by way of example only, with reference to the attached figures.

DETAILED DESCRIPTION

Figure 1:
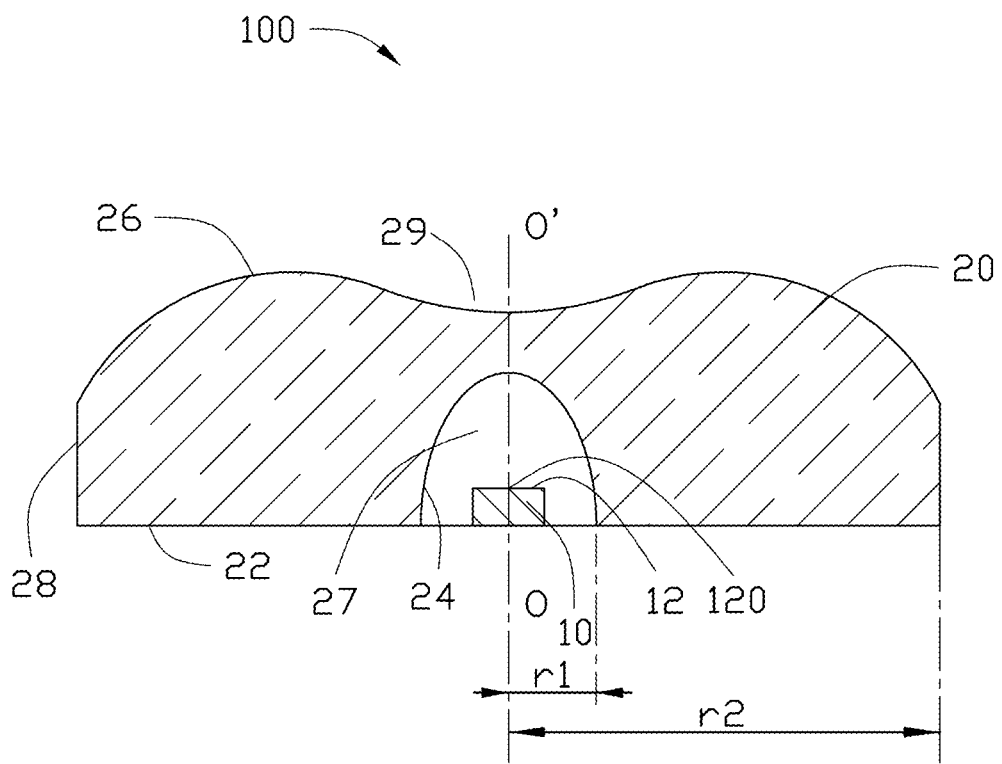
FIG. 1 is a cross sectional view of a first example embodiment of a light emitting device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, substantially cylindrical means that the object resembles a cylinder, but can have one or more deviations from a true cylinder. The term "comprising," means "including, but not necessarily limited to" and specifically indicates open-ended inclusion or membership in the so-described combination, group, series and the like.

The present disclosure is described in relation to a lens. The lens includes a light incident surface and a light output surface. The light incident surface is configured for entrance of light emitting from the light emitting element into the lens. The light output surface is opposite to the light incident surface and configured for radiation of the light from the light emitting element out of the lens. In a coordinate system, the light incident surface satisfies a formula (1):

$$Z_{r_1} = \frac{c_1 r_1^2}{1 + \sqrt{1 - r_1^2 c_1^2}} + \frac{u_1^2(1 - u_1^2)}{\sqrt{1 - r_1^2 c_1^2}} \sum_{m=0}^{M} a_m Q_m(u_1^2).$$

Wherein $c_1$ is a curvature of the light incident surface, $r_1$ is a distance from the center of the lens to a joint point between the light input surface and a radius which is substantially perpendicular to the central axis of the lens, $u_1$ is a normalized radius of the light incident surface, $a_m$ represents the aspheric coefficient, and $Q_m$ is a polynomial of order m and represents that the sum of $a_m$ is equal to the sum of the root mean square of the slope of the light incident surface. The light output surface satisfies a formula (2):

$$Z_{r_2} = \frac{c_2 r_2^2}{1 + \sqrt{1 - r_2^2 c_2^2}} + \frac{u_2^2(1 - u_2^2)}{\sqrt{1 - r_2^2 c_2^2}} \sum_{m=0}^{M} a_m Q_m(u_2^2),$$

$c_2$ is a curvature of the light output surface, $r_2$ is a distance from the center of the lens to a joint point between the light output surface and a radius which is substantially perpendicular to the central axis OO', $u_2$ is a normalized radius of the light output surface, $a_m$ represents the aspheric coefficient, and $Q_m$ is a polynomial of order m and represents that the sum of $a_m$ is equal to the sum of the root mean square of the slope of the light output surface.

The present disclosure is described in relation to a light emitting device. The light emitting device includes a light emitting element and a lens. The lens includes a light incident surface and a light output surface. The light incident surface is configured for entrance of light emitting from the light emitting element into the lens. The light output surface is opposite to the light incident surface and configured for radiation of the light from the light emitting element out of the lens. In a coordinate system, the light incident surface satisfies a formula (1):

$$Z_{r_1} = \frac{c_1 r_1^2}{1 + \sqrt{1 - r_1^2 c_1^2}} + \frac{u_1^2(1 - u_1^2)}{\sqrt{1 - r_1^2 c_1^2}} \sum_{m=0}^{M} a_m Q_m(u_1^2).$$

Wherein $c_1$ is a curvature of the light incident surface, $r_1$ is a distance from the center of the lens to a joint point between the light input surface and a radius which is substantially perpendicular to the central axis of the lens, $u_1$ is a normalized radius of the light incident surface, $a_m$ represents the aspheric coefficient, and $Q_m$ is a polynomial of order m and represents that the sum of $a_m$ is equal to the sum of the root mean square of the slope of the light incident surface. The light output surface satisfies a formula (2):

$$Z_{r2} = \frac{c_2 r_2^2}{1 + \sqrt{1 - r_2^2 c_2^2}} + \frac{u_2^2(1 - u_2^2)}{\sqrt{1 - r_2^2 c_2^2}} \sum_{m=0}^{M} a_m Q_m(u_2^2),$$

$c_2$ is a curvature of the light output surface, $r_2$ is a distance from the center of the lens to a joint point between the light output surface and a radius which is substantially perpendicular to the central axis OO', $u_2$ is a normalized radius of the light output surface, $a_m$ represents the aspheric coefficient, and $Q_m$ is a polynomial of order m and represents that the sum of $a_m$ is equal to the sum of the root mean square of the slope of the light output surface. The light emitting element faces the light incident surface and is coaxial with the lens.

The present disclosure is described in relation to a backlight module. The backlight module includes a circuit board, a plurality of light emitting devices, and a diffusion plate. Each light emitting device includes a light emitting element electrically connected to the circuit board and a lens. The lens includes a light incident surface and a light output surface. The light incident surface is configured for entrance of light emitting from the light emitting element into the lens. The light output surface is opposite to the light incident surface and configured for radiation of the light from the light emitting element out of the lens. In a coordinate system, the light incident surface satisfies a formula (1):

$$Z_{r1} = \frac{c_1 r_1^2}{1 + \sqrt{1 - r_1^2 c_1^2}} + \frac{u_1^2(1 - u_1^2)}{\sqrt{1 - r_1^2 c_1^2}} \sum_{m=0}^{M} a_m Q_m(u_1^2).$$

Wherein $c_1$ is a curvature of the light incident surface, $r^1$ is a distance from the center of the lens to a joint point between the light input surface and a radius which is substantially perpendicular to the central axis of the lens, $u_1$ is a normalized radius of the light incident surface, $a_m$ represents the aspheric coefficient, and $Q_m$ is a polynomial of order m and represents that the sum of $a_m$ is equal to the sum of the root mean square of the slope of the light incident surface. The light output surface satisfies a formula (2):

$$Z_{r2} = \frac{c_2 r_2^2}{1 + \sqrt{1 - r_2^2 c_2^2}} + \frac{u_2^2(1 - u_2^2)}{\sqrt{1 - r_2^2 c_2^2}} \sum_{m=0}^{M} a_m Q_m(u_2^2),$$

$c_2$ is a curvature of the light output surface, $r_2$ is a distance from the center of the lens to a joint point between the light output surface and a radius which is substantially perpendicular to the central axis OO', $u_2$ is a normalized radius of the light output surface, $a_m$ represents the aspheric coefficient, and $Q_m$ is a polynomial of order m and represents that the sum of $a_m$ is equal to the sum of the root mean square of the slope of the light output surface. The light emitting element faces the light incident surface and is coaxial with the lens. The diffusion plate is aligned with the light emitting devices for diffusing and transmitting light emitting out of the light output surface of each light emitting device.

FIG. 1 illustrates a first example embodiment of a light emitting device 100. The light emitting device 100 includes a light emitting element 10 and a lens 20. The lens 20 is positioned above the light emitting element 10 and is configured for controlling light emitting from the light emitting element 10.

The light emitting element 10 is a LED and is configured for emitting light toward the lens 20. The light emitting element 10 includes a light emission surface 12 facing the lens 20. The light emission surface 12 has a central point 120 in a central portion thereof and defines a central axis OO' passing through the central point 120.

The lens 20 can be made of transparent material, such as plastic or glass. The plastic is selected from the group consisting of polymethyl methacrylate (PMMA), polycarbonate (PC), and silicone. The lens 20 includes a bottom surface 22, a light incident surface 24, a light output surface 26, and a connection sidewall 28. The lens 20 defines a receiving cavity 27 and a recess 29. The bottom surface 22 and the light output surface 26 are positioned at opposite sides of the lens 20. The light incident surface 24 is positioned between the bottom surface 22 and the light output surface 26 to form the receiving cavity 27. The connection sidewall 28 is interconnected between the bottom surface 22 and the light output surface 26. The recess 27 is defined in the light output surface 26 and is recessed toward the bottom surface 22. In this embodiment, the light emitting element 10 is received in the receiving cavity 27. The light emission surface 12 faces the light incident surface 24. In this embodiment, the lens 20 is coaxial with the light emitting element 10. The light incident surface 24 is axisymmetrical with respect to the central axis OO' of the lens 20, and the light output surface 26 is axisymmetrical with respect to the central axis OO'.

In a coordinate system, the light incident surface 24 satisfies a formula (1):

$$Z_{r1} = \frac{c_1 r_1^2}{1 + \sqrt{1 - r_1^2 c_1^2}} + \frac{u_1^2(1 - u_1^2)}{\sqrt{1 - r_1^2 c_1^2}} \sum_{m=0}^{M} a_m Q_m(u_1^2),$$

wherein $c_1$ is a curvature of the light incident surface 24. $r_1$ is a distance from the center of the lens 20 to a joint point between the light input surface 24 and a radius which is substantially perpendicular to the central axis OO'. $u_1$ is a normalized radius of the light incident surface 24. In particular, $u_1 = r_1/r_{max}$, $r_{max}$ is a maximum distance from the center of the lens 20 to a joint point between the light input surface 24 and a radius which is substantially perpendicular to the central axis OO'. $a_m$ represents the aspheric coefficient. $Q_m$ is a polynomial of order m and represents that the sum of $a_m$ is equal to the sum of the root mean square (rms) of the slope of the light incident surface 24. In the same coordinate system, the light output surface 26 satisfies a formula (2):

$$Z_{r2} = \frac{c_2 r_2^2}{1 + \sqrt{1 - r_2^2 c_2^2}} + \frac{u_2^2(1 - u_2^2)}{\sqrt{1 - r_2^2 c_2^2}} \sum_{m=0}^{M} a_m Q_m(u_2^2),$$

wherein $c_2$ is a curvature of the light output surface 26. $r_2$ is a distance from the center of the lens 20 to a joint point between the light output surface 26 and a radius which is substantially perpendicular to the central axis OO'. $u_2$ is a normalized radius of the light output surface 26. In particular, $u_2 = r_2/r_{max}$, $r_{max}$ is a maximum distance from the center of the lens 20 to a joint point between the light output surface 26 and a radius which is substantially perpendicular to the central axis OO'. $a_m$ represents the aspheric coefficient. $Q_m$ is a polynomial of order m and represents that the sum of $a_m$ is equal to the sum of the root mean square (rms) of the slope of the light output surface 26. For example, in the formula (2), when m=0, 1, 2, 3, 4, 5, $Q_0(u_2^2)=1$;

$$Q_1(u_2^2) = \frac{1}{\sqrt{19}}(13 - 16u_2^2);$$

$$Q_2(u_2^2) = \sqrt{\frac{2}{95}}[29 - 4u_2^2(25 - 19u_2^2)];$$

$$Q_3(u_2^2) = \sqrt{\frac{2}{2545}}\{207 - 4u_2^2[315 - u_2^2(577 - 320u_2^2)]\};$$

$$Q_4(u_2^2) = \frac{1}{3\sqrt{131831}}(7737 - 16u_2^2\{4653 - 2u_2^2[7381 - 8u_2^2(1168 - 509u_2^2)]\});$$

$$Q_5(u_2^2) = \frac{1}{3\sqrt{6632213}}[66657 - 32u_2^2(28338 - u_2^2\{135325 - 8u_2^2[35884 - u_2^2(34661 - 12432u_2^2)]\})].$$

Figure 2:
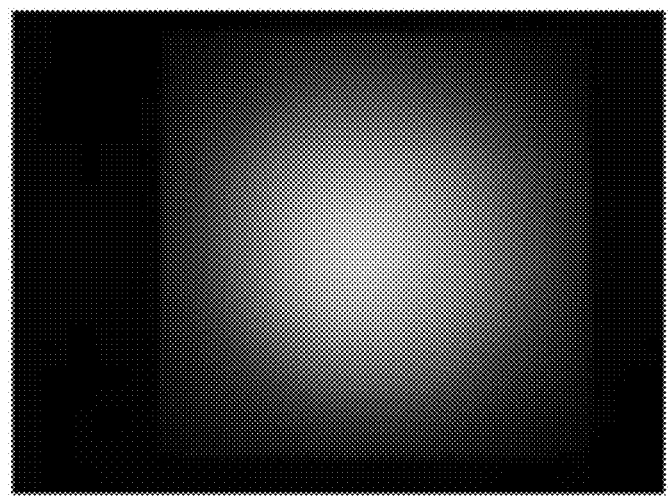
FIG. 2 is a diagrammatic view showing an illumination distribution of light emitted from the light emitting device of FIG. 1.

When in use, light emitted from the light emitting element 10 emits toward the light incident surface 24, and then travels in the lens 20, and finally emits out of the lens 20 through the light output surface 26. As illustrated in FIG. 2, the illumination distribution of light emitted from the light emitting device 100 is uniform.

Figure 3:
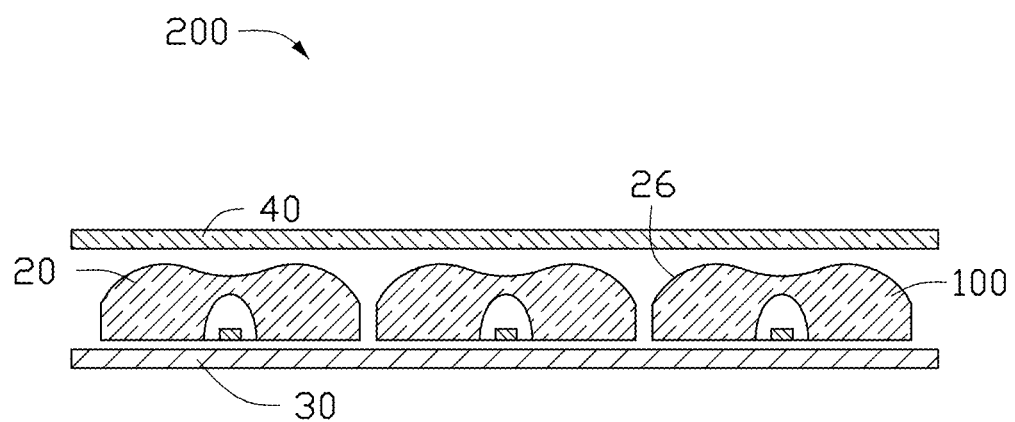
FIG. 3 is a cross sectional view of a second example embodiment of a backlight module.

FIG. 3 illustrates a second example embodiment of a backlight module 200. The backlight module 200 includes a circuit board 30, a number of light emitting devices 100 of the first embodiment and a diffusion plate 40. The light emitting devices 100 are arranged on the circuit board 30 in a matrix array. In detail, the light emitting element 10 are located on the circuit board 30 and are electrically connected to the circuit board 30. Light emitted from the light emitting element 10 emits out of the lens 20 through the light output surface 26 after traveling within the lens 20. The diffusion plate 40 is aligned with the light emitting devices 100 for diffusing and transmitting light emitting out of the light output surface 26 of each light emitting device 100.

The embodiments shown and described above are only examples. Many details are often found in the art such as the other features of a lens, a light emitting device, and a backlight module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A lens comprising:
a light incident surface configured to receive light emitted from a light emitting element; and
a light output surface opposite to the light incident surface and configured to radiate the light received from the light emitting element;
wherein in a coordinate system, the light incident surface satisfies a formula (1):

$$Z_{r_1} = \frac{c_1 r_1^2}{1 + \sqrt{1 - r_1^2 c_1^2}} + \frac{u_1^2(1 - u_1^2)}{\sqrt{1 - r_1^2 c_1^2}} \sum_{m=0}^{M} a_m Q_m(u_1^2),$$

$c_1$ is a curvature of the light incident surface, $r_1$ is a distance from the center of the lens to a joint point between the light input surface and a radius which is substantially perpendicular to the central axis of the lens, $u_1$ is a normalized radius of the light incident surface, $a_m$ represents the aspheric coefficient, $Q_m$ is a polynomial of order m and represents that the sum of $a_m$ is equal to the sum of the root mean square of the slope of the light incident surface; wherein the light output surface satisfies a formula (2):

$$Z_{r_2} = \frac{c_2 r_2^2}{1 + \sqrt{1 - r_2^2 c_2^2}} + \frac{u_2^2(1 - u_2^2)}{\sqrt{1 - r_2^2 c_2^2}} \sum_{m=0}^{M} a_m Q_m(u_2^2),$$

$c_2$ is a curvature of the light output surface, $r_2$ is a distance from the center of the lens to a joint point between the light output surface and a radius which is substantially perpendicular to the central axis OO', $u_2$ is a normalized radius of the light output surface, $a_m$ represents the aspheric coefficient, and $Q_m$ is a polynomial of order m and represents that the sum of $a_m$ is equal to the sum of the root mean square of the slope of the light output surface.

2. The lens of claim 1, wherein the lens further comprises a bottom surface and defines a receiving cavity, and the light incident surface is positioned between the bottom surface and the light output surface to form a receiving cavity.

3. The lens of claim 2, wherein the lens further comprises a connection sidewall, and the connection sidewall is interconnected between the bottom surface and the light output surface.

4. The lens of claim 3, wherein the light output surface defines a recess which is recessed toward the bottom surface.

5. The lens of claim 1, wherein the lens is made of glass or plastic.

6. A light emitting device comprising:
a light emitting element; and
a lens comprising:
a light incident surface configured to receive light emitted from a light emitting element; and
a light output surface opposite to the light incident surface and configured to radiate the light received from the light emitting element;
wherein in a coordinate system, the light incident surface satisfies a formula (1):

$$Z_{r_1} = \frac{c_1 r_1^2}{1 + \sqrt{1 - r_1^2 c_1^2}} + \frac{u_1^2(1 - u_1^2)}{\sqrt{1 - r_1^2 c_1^2}} \sum_{m=0}^{M} a_m Q_m(u_1^2),$$

$c_1$ is a curvature of the light incident surface, $r_1$ is a distance from the center of the lens to a joint point between the light input surface and a radius which is substantially perpendicular to the central axis of the lens, $u_1$ is a normalized radius of the light incident surface, $a_m$ represents the aspheric coefficient, $Q_m$ is a polynomial of order m and represents that the sum of $a_m$ is equal to the sum of the root mean square of the slope of the light incident surface, the light output surface satisfies a formula (2):

$$Z_{r_2} = \frac{c_2 r_2^2}{1+\sqrt{1-r_2^2 c_2^2}} + \frac{u_2^2(1-u_2^2)}{\sqrt{1-r_2^2 c_2^2}} \sum_{m=0}^{M} a_m Q_m(u_2^2),$$

$c_2$ is a curvature of the light output surface, $r_2$ is a distance from the center of the lens to a joint point between the light output surface and a radius which is substantially perpendicular to the central axis OO', $u_2$ is a normalized radius of the light output surface, $a_m$ represents the aspheric coefficient, $Q_m$ is a polynomial of order m and represents that the sum of $a_m$ is equal to the sum of the root mean square of the slope of the light output surface, and the light emitting element faces the light incident surface and is coaxial with the lens.

7. The light emitting device of claim 6, wherein the lens further comprises a bottom surface and defines a receiving cavity, the light incident surface is positioned between the bottom surface and the light output surface to form a receiving cavity, and the light emitting element is received in the receiving cavity.

8. The light emitting device of claim 7, wherein the lens further comprises a connection sidewall, and the connection sidewall is interconnected between the bottom surface and the light output surface.

9. The light emitting device of claim 8, wherein the light output surface defines a recess which is recessed toward the bottom surface.

10. A backlight module comprising:

a circuit board;

a plurality of light emitting devices arranged in a matrix array on the circuit board, each light emitting device comprising:

a light emitting element electrically connected to the circuit board; and a lens comprising:

a light incident surface configured to receive light emitted from a light emitting element; and a light output surface opposite to the light incident surface and configured to radiate the light received from the light emitting element;

wherein in a coordinate system, the light incident surface satisfies a formula (1):

$$Z_{r_1} = \frac{c_1 r_1^2}{1+\sqrt{1-r_1^2 c_1^2}} + \frac{u_1^2(1-u_1^2)}{\sqrt{1-r_1^2 c_1^2}} \sum_{m=0}^{M} a_m Q_m(u_1^2),$$

$c_1$ is a curvature of the light incident surface, $r_1$ is a distance from the center of the lens to a joint point between the light input surface and a radius which is substantially perpendicular to the central axis of the lens, $u_1$ is a normalized radius of the light incident surface, $a_m$ represents the aspheric coefficient, $Q_m$ is a polynomial of order m and represents that the sum of $a_m$ is equal to the sum of the root mean square of the slope of the light incident surface, the light output surface satisfies a formula (2):

$$Z_{r_2} = \frac{c_2 r_2^2}{1+\sqrt{1-r_2^2 c_2^2}} + \frac{u_2^2(1-u_2^2)}{\sqrt{1-r_2^2 c_2^2}} \sum_{m=0}^{M} a_m Q_m(u_2^2),$$

$c_2$ is a curvature of the light output surface, $r_2$ is a distance from the center of the lens to a joint point between the light output surface and a radius which is substantially perpendicular to the central axis OO', $u_2$ is a normalized radius of the light output surface, $a_m$ represents the aspheric coefficient, $Q_m$ is a polynomial of order m and represents that the sum of $a_m$ is equal to the sum of the root mean square of the slope of the light output surface, the light emitting element faces the light incident surface and is coaxial with the lens; and a diffusion plate aligned with the light emitting devices for diffusing and transmitting light emitting out of the light output surface of each light emitting device.

11. The backlight module of claim 10, wherein the lens further comprises a bottom surface and defines a receiving cavity, the light incident surface is positioned between the bottom surface and the light output surface to form a receiving cavity, and the light emitting element is received in the receiving cavity.

12. The backlight module of claim 11, wherein the lens further comprises a connection sidewall, and the connection sidewall is interconnected between the bottom surface and the light output surface.

13. The backlight module of claim 12, wherein the light output surface defines a recess which is recessed toward the bottom surface.

* * * * *